INVENTOR
NORMAN F. HARWOOD

BY Learman, Learman, & McCulloch
ATTORNEYS

United States Patent Office 3,276,075
Patented Oct. 4, 1966

3,276,075
EXTRUSION APPARATUS
Norman F. Harwood, Pinecroft, Hare Lane, Claygate, Surrey, England
Filed Nov. 4, 1963, Ser. No. 321,155
1 Claim. (Cl. 18—12)

This invention relates to extrusion apparatus for plastic materials and is concerned with an improved cross head therefor, the term "cross head" being used herein to denote a die assembly into which extruded material passes and from which material is extruded in a direction transverse to the direction of feed to said assembly.

According to the present invention a cross head adapted for attachment to an extrusion apparatus incorporates means for positively propelling extrusion material, fed from an extruder barrel of the apparatus, through the said head towards an extrusion outlet.

Figure 1:
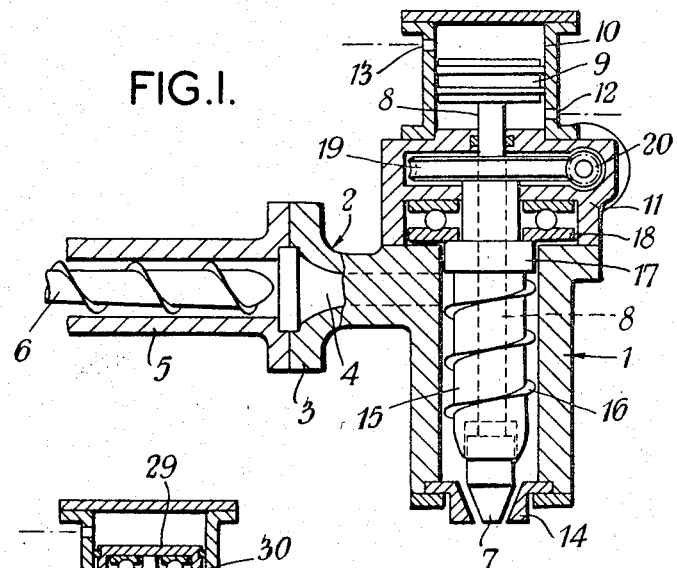
Figure 3:
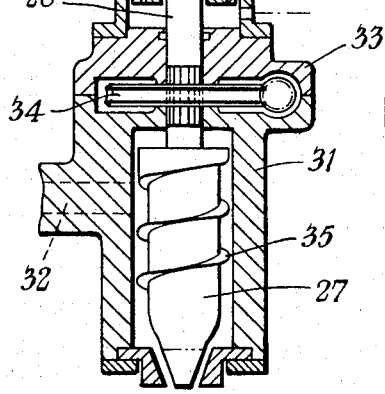
Figure 2:
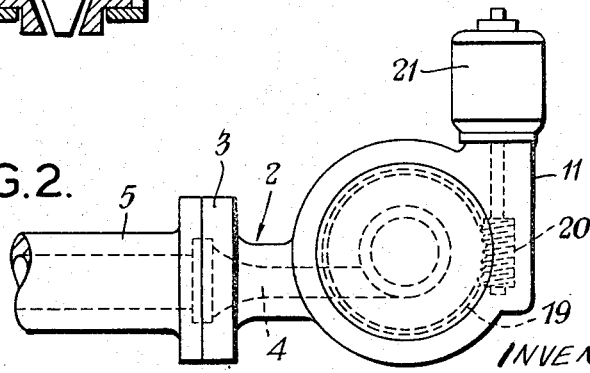

In order that the invention may be more fully understood, two constructions of cross head in accordance with the invention, will now be described, by way of example, with reference to the accompanying drawing, in which, FIGURE 1 shows a longitudinal section taken through the first cross head, FIGURE 2 shows a plan view of the cross head shown in FIGURE 1, and FIGURE 3 shows a longitudinal section taken through the second cross head.

Referring to FIGURES 1 and 2, the cross head comprises a generally cylindrical hollow body 1 carrying a side boss 2 which terminates in a flange 3 and which is bored to provide a transverse passage or inlet 4 leading into the interior chamber of the body 1. As shown in FIGURE 2, the axis of the passage 4 is slightly offset from the axis of the body for a purpose which will be described later.

To the flange 3 there is bolted a standard extruder barrel comprising a hollow cylindrical body 5 and an extruder screw 6 housed within the body. The function of the extruder is to urge plastic material, which has been fed into the body 5, through the passage 4 and into the cross head interior from which it emerges as a plastic tube or parison. For this latter purpose the body 1 houses an inner concentric mandrel 7, the supporting shaft 8 of which is extended back to a mandrel piston 9. The piston 9 is housed within a hydraulic cylinder 10 mounted on an intermediate casing 11 which is in turn mounted on the body 1, the cylinder 10 lying co-axially with the body 1. Actuation of the cylinder which is provided with fluid ports 12 and 13, displaces the mandrel axially relative to the surrounding body and, owing to the leading end or tip of the mandrel 7 being tapered for co-operation with a similarly tapered orifice insert 14 at the end of the body 1 to form an annular discharge opening. The axial movement of the mandrel effects a variation in the annular size of outlet opening defined between the mandrel and surrounding inlet. Variation in the annular size of outlet opening, of course, varies the wall thickness of an extruded plastic tube.

The cross head body incorporates means for positively propelling extrusion material, fed from the extruder, through the head, which means are in the form of a tubular sleeve 15 surrounding the mandrel and carrying a blade helically wound edgewise onto the sleeve so as to form a screw member 16. The sleeve which passes into the casing 11 carries a collar 17 which bears against a thrust bearing 18. A worm wheel 19 is mounted on the upper end of the sleeve to engage with a worm 20 mounted in the casing 11. The screw 16 is thus rotatable and is in fact driven by a hydraulic motor 21 which is mounted on the casing 11 and is coupled to the shaft of the worm 20. The motor 21 and hydraulic cylinder 10 are fed from a programmed hydraulic supply unit or power pack.

In operation of the cross head, material is fed into the cross head interior and, with the mandrel 7 set as required and the motor 21 started, the passage of material through the cross head is assisted by the screw 16. The aforementioned offsetting of the axis of the passage 4 from the axis of the body 1 ensures that the material fed from the extruder enters the screw 16 tangentially of the sleeve 15.

It will be seen that in the above construction the screw 16 is axially fixed, that is, whilst the screw may rotate, axial displacement of the same relative to the cross head body cannot take place. Reference is now made to FIGURE 3 in which the cross head is generally of the same construction as the cross head of FIGURES 1 and 2 with certain exceptions. Here the extruder screw in the body moves axially with the mandrel and the latter rotates with the former. Accordingly the mandrel 27 comprises a single member replacing a mandrel and surrounding sleeve, the mandrel having a tapered tip at the discharge end of the cross head body and having at its other end a shaft 28 which is extended back to a mandrel piston 29. The latter incorporates a thrust bearing 30 which replaces the bearing 18 and which also permits movement of the shaft 28 relative to the piston 29. The body 31 is of a different form to that of the body 1 having an inlet passage or opening 32 nearer the outlet end of the cross head and the upper end of the body incorporates an end wall. Furthermore the body is shaped at this end to define with a casing part 33 a chamber for a worm wheel 34 which is similar to the worm 19 but which is splined to the shaft 28 to accommodate axial shaft movement. As before the worm wheel is driven by a worm to which a hydraulic motor is coupled. The mandrel 27 carries an extruding screw 35.

The operation of the cross head is the same except, as indicated above, the axial position of the screw 35 varies with axial adjustment of the mandrel and the mandrel rotates with the screw.

Owing to the provision of the additional screw 16 or 35 in both the above described cross heads, the likelihood of plastic material being left in stagnant areas or restricted flow zones in the cross head is reduced since this screw ensures that substantially all the material entering the cross head is extruded therefrom. This feature is important since in extrusion apparatus in which dead pockets or restricted flow zones are formed where the material may remain, decomposition of the material particularly in the case of P.V.C., may result and should this affected material be eventually extruded from the cross head the quality of the article being produced by the extrusion process may be impaired.

Whilst the above described cross heads are each of the single nozzle type, the invention is equally applicable to a cross head of the multi-nozzle type, including a plurality of chambers fed from a single extruder.

I claim:

Extrusion apparatus comprising a body having a chamber therein terminating at one end in an outlet orifice and having an inlet remote from said orifice communicating with said chamber substantially tangentially thereof and through which material may be introduced to said chamber; a shaft member terminating at one end in a mandrel; means rotatably mounting said shaft member in said chamber with said mandrel accommodated in said orifice and forming therewith an annular discharge opening through which material may be extruded from said chamber, at least one of said orifice and mandrel being tapered; screw means mounted on said shaft member for rotation therewith to propel material in said chamber toward said orifice; driving means for rotating said shaft member; axially adjustable means connecting said driving means to said shaft member for relative axial adjustment of said shaft member and said chamber; and means for axially adjusting said shaft member relatively to said chamber to vary the size of said orifice.

References Cited by the Examiner

UNITED STATES PATENTS

| | | | |
|---|---|---|---|
| 2,449,652 | 9/1948 | Heston | 18—12 |
| 2,629,132 | 2/1953 | Willcox et al. | |
| 2,688,769 | 9/1954 | Crobett | 18—12 |
| 2,704,380 | 3/1955 | Cuzzi | 18—12 |
| 2,810,159 | 10/1957 | Teichmann | 18—12 |
| 3,001,233 | 9/1961 | Ernst | 18—12 X |
| 3,019,481 | 2/1962 | Negoro | 18—5 |
| 3,032,819 | 5/1962 | Gasmire | 18—5 |
| 3,051,990 | 9/1962 | Peterson | 18—12 X |
| 3,114,932 | 12/1963 | Donnelly | 18—5 |
| 3,115,681 | 12/1963 | Hendry | 18—30 |

FOREIGN PATENTS

| | | |
|---|---|---|
| 548,966 | 7/1956 | Belgium. |
| 1,282,334 | 12/1961 | France. |
| 682,543 | 11/1952 | Great Britain. |
| 890,138 | 2/1962 | Great Britain. |
| 918,946 | 2/1963 | Great Britain. |
| 526,027 | 5/1955 | Italy. |
| 96,927 | 2/1961 | Netherlands. |

WILLIAM J. STEPHENSON, *Primary Examiner.*

MICHAEL V. BRINDISI, J. SPENCER OVERHOLSER,
*Examiners.*

L. S. SQUIRES, *Assistant Examiner.*